United States Patent
Brodjonegoro et al.

(10) Patent No.: US 12,404,567 B2
(45) Date of Patent: Sep. 2, 2025

(54) TREATMENT METHOD FOR LATERITE NICKEL ORE BY CURING AND ROASTING-WATER LEACHING-ATMOSPHERIC PRESSURE ACID LEACHING

(71) Applicants: PT ESG NEW ENERGY MATERIAL, Jakarta (ID); PT QMB NEW ENERGY MATERIALS, Jakarta (ID); GEM CO., LTD., Shenzhen (CN); PT GEM INDONESIA NEW ENERGY MATERIALS, Jakarta (ID)

(72) Inventors: Satryo Soemantri Brodjonegoro, Jakarta (ID); Kaihua Xu, Shenzhen (CN); Yi Wang, Jakarta (ID); Evan Wahyu Kristiyanto, Jakarta (ID); Aad Alief Rasyidi Baking, Jakarta (ID); Tegar Mukti Aji, Jakarta (ID); Rizky Wanaldi, Jakarta (ID); Andi Syaputra Hasibuan, Jakarta (ID)

(73) Assignees: PT ESG NEW ENERGY MATERIAL, Jakarta (ID); PT QMB NEW ENERGY MATERIALS, Jakarta (ID); GEM CO., LTD., Shenzhen (CN); PT GEM INDONESIA NEW ENERGY MATERIALS, Jakarta (ID)

(*) Notice: Subject to any disclaimer, the term of this patent is extended or adjusted under 35 U.S.C. 154(b) by 0 days.

(21) Appl. No.: 18/870,419

(22) PCT Filed: Jul. 28, 2023

(86) PCT No.: PCT/CN2023/109905
§ 371 (c)(1),
(2) Date: Nov. 28, 2024

(87) PCT Pub. No.: WO2025/024979
PCT Pub. Date: Feb. 6, 2025

(65) Prior Publication Data
US 2025/0171875 A1 May 29, 2025

(51) Int. Cl.
*C22B 3/00* (2006.01)
*C22B 3/08* (2006.01)

(52) U.S. Cl.
CPC ............. *C22B 23/043* (2013.01); *C22B 3/08* (2013.01)

(58) Field of Classification Search
CPC .......... C22B 23/043; C22B 3/08; C22B 1/06; C22B 1/00; C22B 23/0461; C22B 1/02
(Continued)

(56) References Cited

FOREIGN PATENT DOCUMENTS

CN 106591579 A * 4/2017 ............... C01F 5/40

OTHER PUBLICATIONS

CN-106591579-A Translation (Year: 2017).*
(Continued)

*Primary Examiner* — Danielle M. Carda
(74) *Attorney, Agent, or Firm* — Hemisphere Law, PLLC; Zhigang Ma

(57) ABSTRACT

A treatment method for laterite nickel ore by curing and roasting-water leaching-atmospheric pressure acid leaching is provided. The treatment method includes the following steps: mixing a laterite nickel ore dry powder, concentrated sulfuric acid, and sodium fluoride uniformly, performing curing and roasting under a reducing atmosphere to obtain a cured material; performing water leaching on the cured material to obtain a water leaching solution and a water leaching slag after filtration; and performing atmospheric
(Continued)

pressure acid leaching on the water leaching slag to obtain an acid leaching solution and an acid leaching slag after filtration.

12 Claims, 1 Drawing Sheet

(58) Field of Classification Search
USPC .......................................................... 75/743
See application file for complete search history.

(56) References Cited

OTHER PUBLICATIONS

Claims of PCT/CN2023/109905, Jul. 28, 2023.
CNIPA (ISA), Written opinion for PCT/CN2023/109905, Dec. 21, 2023.

* cited by examiner

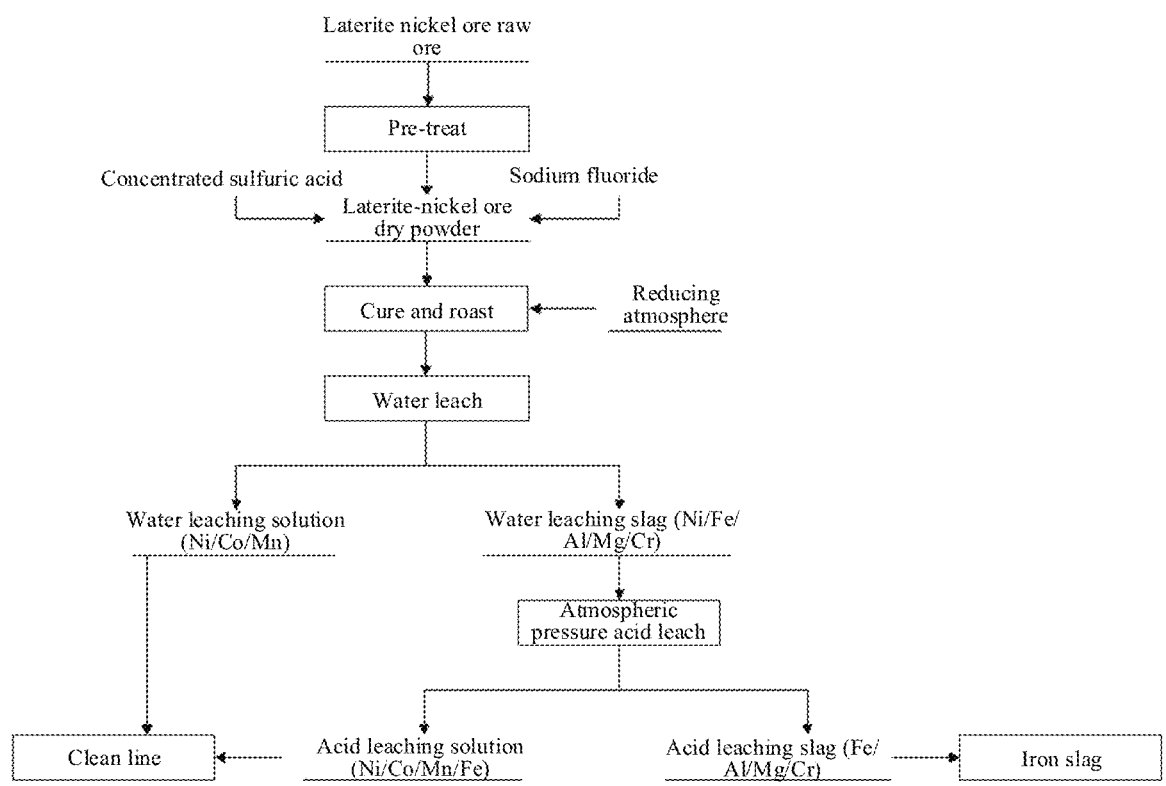

TREATMENT METHOD FOR LATERITE NICKEL ORE BY CURING AND ROASTING-WATER LEACHING-ATMOSPHERIC PRESSURE ACID LEACHING

FIELD OF THE DISCLOSURE

The disclosure relates to the technical field of metal smelting, and in particular to a treatment method for laterite nickel ore by curing and roasting-water leaching-atmospheric pressure acid leaching.

BACKGROUND

At present, the treatment of high-iron and low-magnesium limonite type laterite nickel ore generally adopts hydrometallurgical technology, which can be roughly divided into reduction roasting-ammonia leaching method, high-pressure acid leaching method, atmospheric pressure leaching method, etc. Among them, the reduction roasting-ammonia leaching (Caron) process can treat laterite nickel ore with MgO content of more than 10%, which has the advantages of recycling reagent and low cost, but also has the disadvantages of low nickel and cobalt recovery (nickel yield 75%-80%, cobalt recovery less than 50%). The Caron method was used to extract nickel from raw ore in Brazilian nickel enterprises, and the nickel yield was 70%-75%. With the development of technology, sulfur-adding reduction roasting-ammonia leaching, reduction roasting-acid leaching, oxidation roasting-acid leaching, chlorination roasting-water leaching, sulfation roasting-water leaching, alkaline roasting-pressure acid leaching, and other processes have been developed successively, but the industrial application has not yet been achieved. High-pressure acid leaching (HPAL) has the advantages of low energy consumption, low carbon emission, and high yield (>90%) of nickel and cobalt, and is the main treatment technology for brown iron-type nickel ore at home and abroad. However, the content of Mg (<5%) and Al in the raw ore in the process is required to be high, and the precipitation and scaling of Mg and Al are easy to cause serious equipment corrosion. The leaching rate of valuable metals in laterite nickel ore can be improved by using appropriate surfactant and microwave strengthening in the atmospheric pressure leaching process, which has the advantages of low energy consumption, simple process, small equipment, and easy operation control, but has the disadvantages of low leaching rate, difficult separation of leaching solution and high nickel content in leaching slag.

SUMMARY

The object of the disclosure is to overcome the above-mentioned technical deficiencies and propose a treatment method for laterite nickel ore by curing and roasting-water leaching-atmospheric pressure acid leaching, so as to solve the technical problems of low leaching rate of nickel and cobalt and easy corrosion of equipment in the leaching method of limonite-type laterite nickel ore in the prior art.

The disclosure provides a treatment method for laterite nickel ore by curing and roasting-water leaching-atmospheric pressure acid leaching, including the following steps:

pre-treatment: removing impurities, crushing, drying, ball-milling, and screening the laterite nickel ore raw ore to obtain a laterite nickel ore dry powder;

curing and roasting: mixing the laterite nickel ore dry powder, concentrated sulfuric acid, and sodium fluoride uniformly, and then performing curing and roasting under a reducing atmosphere to obtain a cured material;

water leaching: performing water leaching on the cured material to obtain a water leaching solution and a water leaching slag after filtration;

atmospheric pressure acid leaching: performing atmospheric pressure acid leaching on the water leaching slag to obtain an acid leaching solution and an acid leaching slag after filtration.

Advantageous effects of the disclosure compared with the prior art include:

In the disclosure, the treatment method for laterite nickel ore by curing and roasting-water leaching-atmospheric pressure acid leaching is used, the reaction is controllable, the reaction period is short, the reaction energy consumption is low, and the production cost is low; compared with the traditional high-pressure acid leaching process, it can significantly reduce acid consumption, reduce the loss of valuable metals such as cobalt and nickel, improve metal yield, and increase the economic benefits of production. The treatment method of the disclosure can effectively ensure the leaching rate of cobalt and nickel, at the same time, reduce the corrosion of equipment by strong oxidants, reduce the discharge of waste liquid in the leaching process, and reduce the production cost.

BRIEF DESCRIPTION OF THE DRAWING

FIGURE is a process flowchart of one embodiment of a treatment method for laterite nickel ore by curing and roasting-water leaching-atmospheric pressure acid leaching according to the disclosure.

DETAILED DESCRIPTION OF PREFERRED EMBODIMENTS

In order that the objects, aspects, and advantages of the disclosure will become more apparent, a more particular description of the disclosure will be rendered by reference to the embodiments thereof which are illustrated in the appended drawings. It should be understood that the particular embodiments described herein are illustrative only and are not limiting.

With reference to FIGURE, the disclosure provides a treatment method for laterite nickel ore by curing and roasting-water leaching-atmospheric pressure acid leaching, including the following steps:

Step S1, pre-treatment: removing impurities, crushing, drying, ball-milling, and screening the laterite nickel ore raw ore to obtain a laterite nickel ore dry powder.

Step S2, curing and roasting: mixing the laterite nickel ore dry powder, concentrated sulfuric acid, and sodium fluoride uniformly, and then performing curing and roasting under a reducing atmosphere to obtain a cured material. Through the above-mentioned curing and roasting step, it is beneficial to convert Ni oxide into sulfate, and convert most of the goethite in the raw ore into insoluble hematite, which is beneficial to reduce the iron content in the subsequent water leaching solution; At the same time, $Cr^{6+}$ is reduced to $Cr^{3+}$, which facilitates the removal of chromium ions.

Step S3, water leaching: performing water leaching on the cured material to obtain a water leaching solution and a water leaching slag after filtration. By the above-mentioned water leaching step, it is possible to leach most of the nickel and cobalt in the cured material and inhibit the leaching of iron, and the pH of the resulting water leaching solution is 1-3.

Step S4, atmospheric pressure acid leaching: performing atmospheric pressure acid leaching on the water leaching slag to obtain an acid leaching solution and an acid leaching slag after filtration. Through the above-mentioned atmospheric pressure acid leaching step, it is possible to further recover nickel and cobalt elements in the water leaching slag, thereby increasing the leaching rate of nickel and cobalt. By combining the acid leaching process of the disclosure, the Ni content in the acid leaching slag can be made from 0.005% to 0.15%.

The principle of the disclosure is as follows: Goethite (FeOOH) is one of the main components of laterite nickel ore raw ore. The reaction of goethite with concentrated sulfuric acid can proceed spontaneously, but the temperature has little effect on it. In the presence of sodium fluoride, the reaction of goethite with concentrated sulfuric acid proceeds more easily with the increase in temperature. This is the key mechanism of the disclosure, namely that sodium fluoride+ concentrated sulfuric acid promotes the curing of the laterite nickel ore dry powder. At the same time, the Gibbs free energy of the reaction of $NiFe_2O_4$, $Fe_2O_3$, and $Fe_3O_4$ with sulfuric acid increased slowly with the increase of temperature during the curing process, which indicated that the extent of the reaction was weakened, which was beneficial to the sediment separation of iron oxides; as the temperature increases, the Gibbs free energy of the reaction between NiO and concentrated sulfuric acid decreases, which accelerates the sulfuric acid curing process of nickel and facilitates the conversion of Ni oxide to sulfate. It can be seen that NaF can promote the reaction between concentrated sulfuric acid and NiO in the curing process and inhibit the leaching of Fe, and the relevant reactions are as follows:

$$Fe_2(SO_4)_3 + 6NaF + 3H_2O = Fe_2O_3 + 3Na_2SO_4 + 6HF$$

In addition, $Cr^{6+}$ produced by reacting $CrO_3$ in the laterite nickel ore raw ore with sulfuric acid can be reduced to $Cr^{3+}$ by introducing a reducing gas during curing and roasting, and the relevant reactions are as follows:

$$CrO_3 + 3H_2SO_4 = Cr(SO_4)_3 + 3H_2O$$

$$Cr^{6+} + 1.5H_2 = Cr^{3+} + 3H^+.$$

In this embodiment, the laterite nickel ore raw ore is a low nickel high magnesium laterite nickel ore.

In some embodiments of the disclosure, the laterite nickel ore raw ore has a chemical composition including: Ni 1%-1.5%, Co 0.09%-0.2%, Mn<1%, Fe>35%, Al<5%, Cr<1%, Ca<1%, Mg<5%, Zn<1%, Si>10%.

In this embodiment, in the pre-treatment step, the particle size $d_{50}$ of the laterite nickel ore dry powder is 100 μm or less; The water content of the laterite nickel ore dry powder is less than 0.5%.

In the present embodiment, the mass ratio of the concentrated sulfuric acid to the laterite nickel ore dry powder in the curing and roasting step is (0.1-0.5):1, these include but are not limited to, 0.1:1, 0.2:1, 0.3:1, 0.4:1, 0.5:1, etc. If the acid-to-ore ratio is too high, the content of Fe, Al, and other impurities in the water leaching solution will increase; If the acid-to-ore ratio is too low, the loss of Ni in the leaching slag increases. The mass ratio of sodium fluoride to laterite nickel ore dry powder is (0.05-0.5):1, these include, but are not limited to, 0.05:1, 0.1:1, 0.15:1, 0.2:1, 0.3:1, 0.4:1, 0.5:1, etc. If the proportion of sodium fluoride is too low, the curing of laterite nickel ore will be incomplete, and the content of Ni and Co in water leaching solution will decrease; If the proportion of sodium fluoride is too high, it increases the cost and the difficulty of subsequent impurity removing.

In the present embodiment, in the curing and roasting step, the roasting temperature is 100-400° C., including but not limited to 100° C., 150° C., 200° C., 250° C., 300° C., 350° C., 400° C., etc. and the disclosure is not limited thereto. The addition of sodium fluoride in the disclosure not only promotes the reaction process of the laterite nickel ore and concentrated sulfuric acid, increases the leaching of nickel and inhibits the leaching of the iron, but also reduces the reaction temperature of the curing and roasting step, which not only simplifies the process flow but also significantly reduces the temperature of the reduction roasting compared with the existing process of curing sulfuric acid and the reduction roasting step by step; Roasting pressure ranges from 0 to 1 MPa, including but not limited to 0 MPa, 0.2 MPa, 0.4 MPa, 0.6 MPa, 0.8 MPa, 1 MPa, etc. In the disclosure, by controlling the roasting pressure, the amount of gas per unit volume can be increased to make the reaction more complete; The roasting time is 0.1-3 h, including but not limited to 0.1 h, 0.2 h, 0.5 h, 1 h, 1.5 h, 2 h, 2.5 h, 3 h, etc.; The roasting atmosphere is hydrogen.

In the present embodiment, in the water leaching step, the mass ratio of the cured material to water is 1:(1-5) including, but not limited to, 1:1, 1:2, 1:3, 1:4, 1:5, and the like; The temperature of the water leaching is 30-80° C., including but not limited to 30° C., 40° C., 50° C., 60° C., 70° C., 80° C., etc.; The time of water leaching is from 1 to 3 h, including but not limited to 1 h, 1.5 h, 2 h, 2.5 h, 3 h, etc.

In the present embodiment, the concentration of the acid in the atmospheric pressure acid leaching step is 30%-100%, including but not limited to 30%, 35%, 40%, 45%, 50%, 55%, 60%, 65%, 70%, 75%, 80%, 85%, 90%, 100%, etc.; The sulfur ore mass ratio is (0.05-0.5):1, including, but not limited to, 0.05:1, 0.1:1, 0.2:1, 0.3:1, 0.4:1, 0.5:1, etc.; The temperature of the atmospheric pressure acid leaching is from 40° C. to 90° C., including but not limited to 40° C., 50° C., 60° C., 70° C., 80° C., 90° C., etc.; The time of the atmospheric pressure acid leaching is from 0.1 to 3 h, including but not limited to 0.1 h, 0.5 h, 1 h, 1.5 h, 2 h, 2.5 h, 3 h, etc.

In some embodiments of the disclosure, in the atmospheric pressure acid leaching step, the acid used is concentrated sulfuric acid, and in the atmospheric pressure acid leaching step, pure water is also added, and the mass ratio of the water leaching slag to the pure water is 1:(1-5), including but not limited to 1:1, 1:2, 1:3, 1:4, 1:5, etc.

In this embodiment, the mass fraction of concentrated sulfuric acid is 96-98.3%, including but not limited to 96%, 96.5%, 97%, 97.5%, 98%, 98.3%, etc.

In this embodiment, both the water leaching and atmospheric pressure acid leaching steps are performed under agitation. Further, the stirring speed is 100-500 r/min, including but not limited to 100 r/min, 200 r/min, 300 r/min, 400 r/min, 500 r/min, etc.

In the present embodiment, the above-mentioned water leaching solution and acid leaching solution can enter a subsequent purification line, separate nickel, and cobalt after purification treatment, and can also achieve the joint purification of nickel and cobalt, and the disclosure is not limited thereto, and a person skilled in the art would have been able to make a selection according to actual situations; after the above-mentioned acid leaching slag is subjected to the iron removal process, the iron slag can be separated to realize the recovery of the iron.

In order to avoid redundant description, in the following examples and comparative examples of the disclosure, the mass fraction of concentrated sulfuric acid used was 98%, and the main components of the laterite nickel ore raw ore used were as follows:

TABLE 1

|  | Ni | Co | Mn | Fe | Al | Cr | Ca | Mg | Zn | Si |
|---|---|---|---|---|---|---|---|---|---|---|
| Raw ore | 1.25% | 0.103% | 0.723% | 36.23% | 3.66% | 0.827% | 0.422% | 3.10% | 0.024% | 10.2% |

Example 1

(1) pre-treatment: The laterite nickel ore raw ore was subjected to impurity removal, crushing, drying, ball-milling, and screening to obtain an ore powder with a $d_{50}$ of 89 microns and a water content of less than 0.3%;
(2) curing and roasting: Concentrated sulfuric acid was added to the laterite nickel ore dry powder at a sulfur ore mass ratio of 0.32, and NaF was added at a mass ratio of 0.15. After being fully mixed, the mixture was divided into granules and placed in a tubular furnace for roasting. The reaction temperature was 400° C., the reaction time was 2 h, the furnace atmosphere was hydrogen, and the pressure was 0.5 MPa;
(3) water leaching: After curing, pure water was added to the cured material at a mass ratio of 1:3, the stirring speed was 300 r/min, the water leaching temperature was 70° C., the water leaching time was 2 h, and after filtration, the leaching rates of Ni and Co were 91.8% and 90.6%, and the leaching rate of Fe was 0.8%;
(4) atmospheric pressure acid leaching: Pure water and concentrated sulfuric acid were added to the water leaching slag at a mass ratio of 1:2.5 and a sulfur ore mass ratio of 0.36 (wet slag weight). The acid leaching temperature was 50° C., the time was 1 h, and the stirring speed was 300 r/min. Wherein, the leaching rates of Ni and Co (calculated on slag) were 89.5% and 87.6% respectively, the $Cr^{6+}$ content in the acid leaching solution was 0.21 mg/L, and the nickel content in the acid leaching slag was 0.12%.

Example 2

(1) pre-treatment: The laterite nickel ore raw ore was subjected to impurity removal, crushing, drying, ball-milling, and screening to obtain an ore powder with a $d_{50}$ of 85 microns and a water content of less than 0.3%;
(2) curing and roasting: Concentrated sulfuric acid was added to the laterite nickel ore dry powder at a sulfur ore mass ratio of 0.35, and NaF was added at a mass ratio of 0.2. After being fully mixed, the mixture was divided into granules and placed in a tubular furnace for roasting. The reaction temperature was 250° C., the reaction time was 2 h, the furnace atmosphere was hydrogen, and the pressure was 0.41 MPa;
(3) water leaching: After curing, pure water was added to the cured material at a mass ratio of 1:3, the stirring speed was 300 r/min, the water leaching temperature was 80° C., the water leaching time was 1 h, and after filtration, the leaching rates of Ni and Co were 97.3% and 91.5%, and the leaching rate of Fe was 0.2%;
(4) atmospheric pressure acid leaching: Pure water and concentrated sulfuric acid were added to the water leaching slag at a mass ratio of 1:2.5 and a sulfur ore mass ratio of 0.36 (wet slag weight). The acid leaching temperature was 90° C., the time was 1 h, and the stirring speed was 300 r/min. Wherein, the leaching rates of Ni and Co (calculated on slag) were 87.2% and 84.6% respectively, the $Cr^{6+}$ content in the acid leaching solution was 0.19 mg/L, and the nickel content in the acid leaching slag was 0.05%.

Example 3

(1) pre-treatment: The laterite nickel ore raw ore was subjected to impurity removal, crushing, drying, ball-milling, and screening to obtain an ore powder with a $d_{50}$ of 91 microns and a water content of less than 0.3%;
(2) curing and roasting: Concentrated sulfuric acid was added to the laterite nickel ore dry powder at a sulfur ore mass ratio of 0.39, and NaF was added at a mass ratio of 0.3. After being fully mixed, the mixture was divided into granules and placed in a tubular furnace for roasting. The reaction temperature was 250° C., the reaction time was 3 h, the furnace atmosphere was hydrogen, and the pressure was 0.5 MPa;
(3) water leaching: After curing, pure water was added to the cured material at a mass ratio of 1:3, the stirring speed was 300 r/min, the water leaching temperature was 70° C., the water leaching time was 2 h, and after filtration, the leaching rates of Ni and Co were 98.5% and 92.7%, and the leaching rate of Fe was 0.1%;
(4) atmospheric pressure acid leaching: Pure water and concentrated sulfuric acid were added to the water leaching slag at a mass ratio of 1:2.5 and a sulfur ore mass ratio of 0.36 (wet slag weight). The acid leaching temperature was 90° C., the time was 2 h, and the stirring speed was 300 r/min. Wherein, the leaching rates of Ni and Co (calculated on slag) were 92.8% and 90.3% respectively, the $Cr^{6+}$ content in the acid leaching solution was 0.17 mg/L, and the nickel content in the acid leaching slag was 0.07%.

Comparative Example 1

Compared with Example 1, the only difference was that in the pre-treatment step, the water content of the laterite nickel ore powder was controlled to be 20%.
Using this method, after water leaching, the leaching rates of Ni and Co were 86.3%, and 85.9%, and the leaching rate of Fe was 1.1%; after atmospheric pressure acid leaching, the leaching rates of Ni and Co were 88.3%, and 85.2%, respectively. The content of $Cr^{6+}$ in acid leaching solution was 0.22 mg/L, and the content of Ni in acid leaching slag was 0.15%.

Comparative Example 2

Compared with Example 1, the only difference was that no sodium fluoride was added during the curing and roasting step.
Using this method, after water leaching, the leaching rates of Ni and Co were 76.3% and 74.9%, and the leaching rate of Fe was 1.5%; after atmospheric pressure acid leaching, the leaching rates of Ni and Co were 85.6%, and 84.3%, respectively. The content of $Cr^{6+}$ in acid leaching solution was 20.2 mg/L, and the content of Ni in acid leaching slag was 0.23%.

Comparative Example 3

Compared with Example 1, the only difference was that no hydrogen was introduced during the curing and roasting step.

Using this method, after water leaching, the leaching rates of Ni and Co were 91.8%, and 90.8%, and the leaching rate of Fe was 0.1%; after atmospheric pressure acid leaching, the leaching rates of Ni and Co were 92.3%, and 91.5%, respectively. The content of $Cr^{6+}$ in acid leaching solution was 325.2 mg/L, and the content of Ni in acid leaching slag was 0.09%.

The particular embodiments of the disclosure described above are not to be construed as limiting the scope of the disclosure. It is intended that the disclosure cover the modifications and variations of this invention provided they come within the scope of the appended claims and their equivalents.

What is claimed is:

1. A treatment method for laterite nickel ore by curing and roasting-water leaching-atmospheric pressure acid leaching, comprising the following steps:
   pre-treatment: removing impurities, crushing, drying, ball-milling, and screening the laterite nickel ore raw ore to obtain a laterite nickel ore dry powder;
   curing and roasting: mixing the laterite nickel ore dry powder, concentrated sulfuric acid, and sodium fluoride uniformly, and then performing curing and roasting under a reducing atmosphere to obtain a cured material;
   water leaching: performing water leaching on the cured material to obtain a water leaching solution and a water leaching slag after filtration;
   atmospheric pressure acid leaching: performing atmospheric pressure acid leaching on the water leaching slag to obtain an acid leaching solution and an acid leaching slag after filtration.

2. The treatment method for laterite nickel ore by curing and roasting-water leaching-atmospheric pressure acid leaching according to claim 1, wherein in the pre-treatment step, the laterite nickel ore raw ore is a low-nickel high-magnesium laterite nickel ore.

3. The treatment method for laterite nickel ore by curing and roasting-water leaching-atmospheric pressure acid leaching according to claim 1, wherein in the pre-treatment step, the particle size d50 of the laterite nickel ore dry powder is 100 μm or less; the laterite nickel ore dry powder has a water content of less than 0.5%.

4. The treatment method for laterite nickel ore by curing and roasting-water leaching-atmospheric pressure acid leaching according to claim 1, wherein in the curing and roasting step, a mass ratio of the concentrated sulfuric acid to the laterite nickel ore dry powder is (0.1-0.5):1, a mass ratio of the sodium fluoride to the laterite nickel ore dry powder is (0.05-0.5):1.

5. The treatment method for laterite nickel ore by curing and roasting-water leaching-atmospheric pressure acid leaching according to claim 4, wherein in the curing and roasting step, the mass ratio of the concentrated sulfuric acid to the laterite nickel ore dry powder is (0.3-0.4):1, the mass ratio of the sodium fluoride to the laterite nickel ore dry powder is (0.15-0.3):1.

6. The treatment method for laterite nickel ore by curing and roasting-water leaching-atmospheric pressure acid leaching according to claim 1, wherein in the curing and roasting step, a roasting temperature is 100-400° C., a roasting pressure is 0-1 MPa, a roasting time is 0.1-3 h, and the reducing atmosphere is hydrogen gas.

7. The treatment method for laterite nickel ore by curing and roasting-water leaching-atmospheric pressure acid leaching according to claim 6, wherein in the curing and roasting step, the roasting temperature is 250-400° C., the roasting pressure is 0.4-0.5 MPa, the roasting time is 1-3 h.

8. The treatment method for laterite nickel ore by curing and roasting-water leaching-atmospheric pressure acid leaching according to claim 1, wherein in the water leaching step, a mass ratio of the cured material to water is 1:(1-5); a temperature of the water leaching is 30-80° C. and a time of the water leaching is 1-3 h.

9. The treatment method for laterite nickel ore by curing and roasting-water leaching-atmospheric pressure acid leaching according to claim 8, wherein in the water leaching step, the mass ratio of the cured material to water is 1:(2-4); the temperature of the water leaching is 70-80° C. and the time of the water leaching is 1-2 h.

10. The treatment method for laterite nickel ore by curing and roasting-water leaching-atmospheric pressure acid leaching according to claim 1, wherein in the atmospheric pressure acid leaching step, a concentration of acid is 30%-100%, and a mass ratio of the acid to the water leaching slag is (0.05-0.5):1; a temperature of the atmospheric pressure acid leaching is 40-90° C., and a time of the atmospheric pressure acid leaching is 0.1-3 h.

11. The treatment method for laterite nickel ore by curing and roasting-water leaching-atmospheric pressure acid leaching according to claim 10, wherein in the atmospheric pressure acid leaching step, the acid used is concentrated sulfuric acid; and in the atmospheric pressure acid leaching step, water is also added, and the mass ratio of the water leaching slag to the water is 1:(1-5).

12. The treatment method for laterite nickel ore by curing and roasting-water leaching-atmospheric pressure acid leaching according to claim 1, wherein the water leaching and atmospheric pressure acid leaching steps are performed under stirring.

* * * * *